July 15, 1941.     S. C. EWING     2,249,465
CONTROL SYSTEM FOR SYNCHRONOUS MACHINES
Filed Aug. 27, 1940
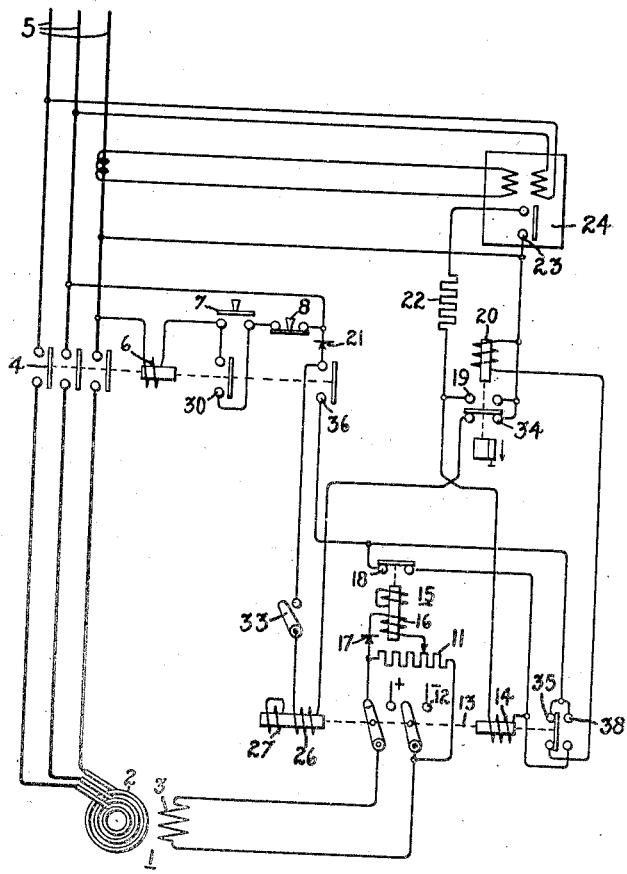
Inventor:
Samuel C. Ewing,
by Harry E. Dunham
His Attorney.

Patented July 15, 1941

2,249,465

UNITED STATES PATENT OFFICE 2,249,465

CONTROL SYSTEM FOR SYNCHRONOUS MACHINES

Samuel C. Ewing, Scotia, N. Y., assignor to General Electric Company, a corporation of New York Application August 27, 1940, Serial No. 354,375

8 Claims. (Cl. 172—289)

My invention relates to control systems for synchronous machines and particularly to synchronous motor control systems, and an object of my invention is to provide an improved arrangement for controlling the application and removal of the field excitation of a synchronous machine.

In United States Letters Patent 1,896,074, granted February 7, 1933, on an application filed by me and assigned to the assignee of this application there is disclosed and claimed a synchronous motor field excitation control system, and my present invention is an improvement of that arrangement in that my improved arrangement requires fewer timing devices and, therefore, is a cheaper and simpler arrangement.

My invention will be better understood from the following description when taken in connection with the accompanying drawing and the single figure of which is a diagrammatic showing of a synchronous motor control system embodying my invention, and the scope of my invention will be pointed out in the appended claims.

Referring to the drawing, 1 represents a synchronous motor having an armature winding 2 and a field winding 3.

In order to simplify the disclosure, I have shown my invention in connection with a full voltage starting arrangement for the synchronous motor 1 in which the motor is started by connecting the armature winding 2, by means of a suitable line switch 4, directly across an alternating current supply circuit 5. With such an arrangement normal voltage is supplied to the motor armature winding to start the motor from rest and bring it up to approximately synchronous speed as an induction motor. It is to be understood, however, that my invention is applicable to any other suitable arrangement for starting and accelerating the synchronous motor to approximately synchronous speed as an induction motor. As shown in the drawing, the line switch 4 has a closing coil 6 which is arranged to be connected across one phase of the supply circuit 5 when a suitable "start" switch 7 is closed. This "start" switch 7 may be a float switch, time switch, thermostat, or any other suitable control device, examples of which are well known in the art, for initiating the starting operation of the motor. In the circuit of the closing coil 6, I provide the normally closed contacts of a suitable manually controlled "stop" switch 8 which is operated when it is desired to stop the motor. The line switch 4, when closed, completes for its closing coil 6 a locking circuit which is independent of the control switch 7 so that this switch may be opened without effecting the opening of the line switch 4.

The field winding 3 of the motor 1 is normally short-circuited through a discharge resistor 11 and is arranged to be connected to a suitable source of excitation 12 when the motor 1 reaches a predetermined speed. In the particular arrangement shown in the drawing a two-position field switch 13 is provided for controlling the connections of the field winding 3. In one of its positions the field switch 13 connects the discharge resistor 11 across the terminals of the field winding 3, and in its other position it connects the field winding 3 to the source of excitation 12. The field switch 13 is provided with a closing coil 14 which, when energized, operates the switch so as to disconnect the field winding 3 from the discharge resistor 11 and connect the field winding 3 to the source of excitation 12. For effecting the energization of the closing coil 14 when the motor 1 reaches substantially synchronous speed I employ a time relay 15 having a winding 16 connected in series with a half-wave rectifier 17 across a portion or all of the discharge resistor 11. With such an arrangement the induced current which flows through the motor field winding 3, while the motor 1 is operating below synchronous speed, causes sufficient pulsating current to flow through the winding 16 to maintain the armature of the relay 15 in its attracted position until the motor reaches approximately synchronous speed at which time the frequency of the induced current becomes so low that the portion of each cycle of induced field current during which no current flows through the relay winding 16 is sufficiently long to allow the relay armature to be restored to its normal position.

The relay 15 is provided with contacts 18 which are closed when the relay is in its normal position and which are connected in the energizing circuit of the closing coil 14 of the field switch 13. The energizing circuit of the closing coil 14 also includes the contacts 19 of a relay 20 the winding of which is arranged to be connected across one phase of the supply circuit 5 through suitable rectifying means 21 when the field switch 13 is open and the line switch 6 or the "start" switch 7 is closed. The relay 20 is of the time delay drop-out type so that it maintains its contacts 19 closed for a predetermined time after the winding of the relay is deenergized. A shunt circuit through a suitable current limiting device, such as a resistor 22, and through the contacts 23 of a suitable pull-out relay 24, is provided around the contacts 19 so as to maintain the closing coil 14 energized as long as the motor 1 remains in step after the synchronizing operation thereof. The pull-out relay 24 is connected to the motor 1 in any suitable manner, examples of which are well known in the art, so that the contacts 23 are opened when the motor 1 falls out of step. In the particular embodiment shown in the drawing the pull-out relay 24 is a power-factor relay which is connected to the armature circuit of the motor 1 and which is arranged in any suitable manner so that it opens its contacts 23 in response to the power-factor of the motor armature circuit decreasing below a predetermined lagging value.

In order to prevent the field switch 13 from being closed by the relay 20, closing its contacts 19 at the instant of starting the motor and for insuring the immediate opening of the field switch 13 when the motor 1 falls out of step and effects the deenergization of the closing coil 14, I provide the field switch 13 with a second winding 26 which, when energized, produces a torque in opposition to the torque produced by the closing coil 14. The torque produced by the winding 26, therefore, is in a direction to maintain the field switch 13 in its open position in which position the discharge resistor 11 is connected across the terminals of the field winding 3, and the source of excitation 12 is disconnected from the terminals of the field winding 3. Also the windings 14 and 26 are arranged in any suitable manner so that the torque produced by the winding 14 exceeds the torque produced by the winding 26 when the field switch 13 is closed but is less than torque produced by the winding 26 when the field switch is open. Therefore, when the field switch 13 is open it can not be closed as long as the winding 26 is energized and similarly when the field switch 13 is closed, it can not be opened as long as the winding 14 is energized. Preferably the winding 26 has a short-circuited winding 27 associated therewith so that the decay of flux, when the winding 26 is deenergized, produces a time lag in the reduction of the torque produced by the winding 26.

The operation of the embodiment of my invention shown in the drawing is as follows:

When it is desired to start the motor 1, a control switch 33 is first closed to complete an energizing circuit for the winding 26 of field switch 13 across one phase of the supply circuit 5 through the rectifier 21 and the contacts 34 of relay 20. The energization of the winding 26 insures that the field switch 13 is in its open position at the instant of starting. The "start" switch 7 is closed so that an energizing circuit is completed for the closing coil 6 of the line switch 4 across one phase of the supply circuit 5. This energizing circuit also includes the normally closed contacts of the stop switch 8. The energization of the closing coil 6 closes the line switch 4 so that normal voltage is applied to the motor armature winding 2 to start the motor from rest and accelerate it as an induction motor to approximately synchronous speed. By closing its auxiliary contacts 30, the line switch 4 completes for the closing coil 6 a locking circuit which is independent of the "start" switch 7 so that this switch may be opened without effecting the opening of the line switch 4.

The closing of the line switch 4 also completes an energizing circuit for the winding of relay 20 through the auxiliary contacts 35 of the field switch 13, the contacts 36 of line switch 4, and the rectifier 21. By opening its contacts 34, relay 20 interrupts the energizing circuit of the winding 26, but, due to the winding 27, the holding effect of the winding 26 does not decrease until after the relay 15 has had time to open its contacts 18 in the energizing circuit of the closing coil 14, so that even if the circuit of the closing coil 14 is momentarily completed by the relay 20 closing its contacts 19, the field switch 13 is not closed at this time.

As soon as the motor armature winding 2 is energized by the closing of the line switch 4, a voltage of slip frequency is induced in the motor field winding 3, and this voltage causes a current of slip frequency to flow through the field winding 3 and the discharge resistor 11 and causes a pulsating current to flow through the winding 16 of the relay 15. Until the motor reaches substantially synchronous speed, the magnitude and frequency of the current through the winding 16 are such as to cause the relay to attract its armature and maintain it in its attracted position so that the contacts 18 are opened.

When the motor speed reaches a predetermined value near synchronous speed, the frequency of the induced current in the field winding 3 becomes so low that the portion of each slip cycle during which no current flows through the winding 16 of relay 15 is sufficiently long to allow the relay to close its contacts 18 and complete an energizing circuit for the closing coil 14 of the field switch 13 across one phase of the supply circuit 5. This energizing circuit also includes the rectifier 21, the contacts 36 of the line switch 4, and the contacts 19 of the relay 20. The energization of the closing coil 14 closes the field switch 13 so as to connect the field winding 3 across the source of excitation 12 thereby causing the motor 1 to pull into synchronism.

The closing of the auxiliary contacts 38 of the field switch 13 completes a shunt circuit around the contacts 18 of the relay 15, and the opening of the contacts 35 of the field switch 13 interrupts the energizing circuit of the time relay 20 which, after a time interval, opens its contacts 19 in the energizing circuit of the closing coil 14. Before this energizing circuit is opened however, another energizing circuit is completed for the closing coil 14 through the resistor 22 and the contacts 23 of the pull-out relay 24. When the relay 20 closes its contacts 34, the heretofore described circuit of the winding 26 is re-established but since the field switch 13 is in its closed position and the closing coil 14 is energized, the winding 26 can not effect the opening of the field switch at this time.

In case the motor 1 is pulled out of step for any reason, the power-factor of the motor armature circuit decreases to a sufficiently low lagging value to cause the pull-out relay 24 to open its contacts 23 and interrupt the heretofore described energizing circuit of the closing coil 14 of the field switch 13. Since the winding 26 is energized at this time, it effects the immediate opening of the field switch 13 so that the field winding 3 is disconnected from the source of excitation 12 and is reconnected to the discharge resistor 11. As soon as the field switch 13 opens, the heretofore described circuit for the relay 20 is completed through the contacts 35 of the field switch 13 so as to effect the deenergization of the winding 26. As soon as the flux interlinking the winding 26 decreases below a predetermined value and the motor speed is again above the dropout value of the relay 15, the circuit of the closing coil 14 of the field switch 13 is completed in the manner heretofore described to reclose the field switch 13 and cause the motor to resynchronize.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a synchronous machine having a field winding, a source of excitation, a field switch for connecting said source to said winding, means for closing said switch, means for holding said switch in its open position and for effecting the movement of said switch from its closed position to its open position when said closing means is inoperative and said holding means is operative, means for rendering said holding means operative while said machine is not in operation, means for starting said machine and for rendering said holding means inoperative during the starting operation of said machine, means for rendering said closing means operative after said machine is started and said holding means has been rendered inoperative, means responsive to the closing of said field switch for rendering said holding means operative, and means responsive to said machine falling out of step for rendering said closing means inoperative whereby said field switch is opened by said holding means.

2. In combination, a synchronous machine having a field winding, a source of excitation, a field switch for connecting said source to said winding, means for closing said switch, means for holding said switch in its open position and for effecting the movement of said switch from its closed position to its open position when said closing means is inoperative and said holding means is operative, means for rendering said holding means operative while said machine is not in operation, means for starting said machine as an induction motor and for rendering said holding means inoperative a predetermined time after said motor is started, means dependent upon the speed of said machine for rendering said closing means operative after said holding means has been rendered inoperative, means responsive to the closing of said field winding for rendering said holding means operative, and means responsive to said machine falling out of step for rendering said closing means inoperative whereby said field switch is opened by said holding means.

3. In combination, a synchronous machine having a field winding, a source of excitation, a field switch for connecting said source to said winding, means for closing said switch, means for holding said switch in its open position and for effecting the movement of said switch from its closed position to its open position when said closing means is inoperative and said holding means is operative, means for rendering said holding means operative while said machine is not in operation, means for starting said machine and for rendering said holding means inoperative during the starting operation of said machine, means for rendering said closing means operative after said machine is started and said holding means has been rendered inoperative, means responsive to the closing of said field switch for rendering said holding means operative, means responsive to said machine falling out of step for rendering said closing means inoperative whereby said field switch is opened by said holding means, and means responsive to the opening of said field switch for rendering said holding means inoperative.

4. In combination, a synchronous motor having an armature winding and a field winding, means for supplying alternating current to said armature winding, a source of excitation, a field switch for connecting said source to said field winding, a closing coil for said switch, a holding coil for said switch, means for energizing said holding coil when said armature winding is deenergized, means responsive to the energization of said armature winding for deenergizing said holding coil, means responsive to a predetermined speed of said motor for energizing said closing coil, means responsive to the closing of said field switch for energizing said holding coil, and means responsive to said motor falling out of step for deenergizing said closing coil while said holding coil is energized.

5. In combination, a synchronous motor having an armature winding and a field winding, means for supplying alternating current to said armature winding, a source of excitation, a field switch for connecting said source to said field winding, a closing coil for said switch, a holding coil for said switch, means for energizing said holding coil when said armature winding is deenergized, means responsive to the energization of said armature winding for deenergizing said holding coil, means responsive to a predetermined speed of said motor for energizing said closing coil, means responsive to the closing of said field switch for energizing said holding coil, means responsive to said motor falling out of step for deenergizing said closing coil while said holding coil is energized, and means responsive to the opening of said field switch while said armature winding is energized for deenergizing said holding coil.

6. In combination, a synchronous machine having an armature winding and a field winding, an alternating current supply circuit, switching means for connecting said armature winding to said supply circuit, a source of excitation, a field switch for connecting said source to said field winding, a coil for closing said field switch, a coil for holding said switch in its open position, means for energizing said holding coil while said armature winding is disconnected from said supply circuit, means for operating said switching means to connect said supply circuit to said armature winding and for deenergizing said holding coil, means for energizing said closing coil after said operation of said switching means, means responsive to the closing of said field switch for energizing said holding means, and means responsive to said machine falling out of step for deenergizing said closing coil.

7. In combination, a synchronous machine having an armature winding and a field winding, an alternating current supply circuit, switching means for connecting said armature winding to said supply circuit, a source of excitation, a field switch for connecting said source to said field winding, a coil for closing said field switch, a coil for holding said switch in its open position, means for energizing said holding coil while said armature winding is disconnected from said supply circuit, means for operating said switching means to connect said supply circuit to said armature winding and for deenergizing said holding coil, means for energizing said closing coil after said operation of said switching means, means responsive to the closing of said field switch for energizing said holding means, means responsive to said machine falling out of step for deenergizing said closing coil, and means responsive to the opening of said field switch while said armature winding is connected to said supply circuit for deenergizing said holding coil.

8. In combination, a synchronous machine having an armature winding and a field winding, an alternating current supply circuit, switching means for connecting said armature winding to said supply circuit, a source of excitation, a field switch for connecting said source to said field winding, a coil for closing said field switch, a coil for holding said switch in its open position, means for energizing said holding coil while said armature winding is disconnected from said supply circuit, means for operating said switching means to connect said supply circuit to said armature winding and for deenergizing said holding coil, a time delay dropout relay, means controlled by said switching means and said field switch for effecting the energization of said relay when said armature winding is connected to said supply circuit and said field switch is open, means controlled by said relay for deenergizing said holding coil only when said relay is in its operated position, means responsive to the current induced in said field winding when said machine is operating subsynchronously, means controlled by said induced current responsive means and said relay for energizing said closing coil when said relay is in its operated position and the speed of said machine is above a predetermined value, and means responsive to said machine falling out of step for deenergizing said closing coil.

SAMUEL C. EWING.